(12) United States Patent
Wu (10) Patent No.: US 8,544,119 B2
(45) Date of Patent: Oct. 1, 2013

(54) CLOTH ASSEMBLY FOR MAKING A PROTECTIVE PAD FOR SPORTS

(76) Inventor: Ying-Ching Wu, Tainan (TW)

( * ) Notice: Subject to any disclaimer, the term of this patent is extended or adjusted under 35 U.S.C. 154(b) by 213 days.

(21) Appl. No.: 13/286,275

(22) Filed: Nov. 1, 2011

(65) Prior Publication Data

US 2013/0104301 A1    May 2, 2013

(51) Int. Cl.
*A41D 13/05* (2006.01)
(52) U.S. Cl.
USPC .............................. 2/455; 2/267; 2/22; 2/908
(58) Field of Classification Search
USPC ................... 2/455, 456, 267, 16, 22, 24, 464, 2/465, 467, 908, 910–913, 915–917, 920, 2/69, 161.1, 161.4, 161.6, 162, 167, 169, 2/271, 243.1; 602/1, 5, 6, 20, 21, 23, 26, 602/27, 41, 60–62, 64, 65, 75, 76, 78; 428/85, 428/86, 88, 92, 95, 100, 116, 110, 112, 192, 428/193; 128/878, 879, 881, 882; 66/170, 66/171, 174, 190, 191, 194, 196; 442/318
See application file for complete search history.

(56) References Cited

U.S. PATENT DOCUMENTS

| | | | | |
|---|---|---|---|---|
| 3,999,748 A * | 12/1976 | Clarke | ........................ | 273/348.4 |
| 4,280,342 A * | 7/1981 | Eng et al. | ........................ | 66/177 |
| 4,677,011 A * | 6/1987 | Matsuda | ........................ | 428/88 |
| 4,961,418 A * | 10/1990 | McLaurin-Smith | ............ | 602/21 |
| 5,015,251 A * | 5/1991 | Cherubini | ..................... | 606/203 |
| 5,166,480 A * | 11/1992 | Bottger et al. | ................ | 181/292 |
| 5,413,837 A * | 5/1995 | Rock et al. | ..................... | 428/192 |
| 5,735,145 A * | 4/1998 | Pernick | ........................... | 66/196 |
| 6,151,928 A * | 11/2000 | Anyon et al. | ................... | 66/196 |
| 6,171,679 B1 * | 1/2001 | Wen | ................................ | 428/112 |
| 6,186,966 B1 * | 2/2001 | Grim et al. | ........................ | 602/6 |
| 6,955,999 B1 * | 10/2005 | Boye | ............................. | 442/205 |
| 8,468,853 B2 * | 6/2013 | Shepley et al. | ............... | 66/85 R |
| 2004/0167456 A1 * | 8/2004 | Kingsford et al. | .............. | 602/48 |
| 2011/0162126 A1 * | 7/2011 | Zhang et al. | ...................... | 2/159 |

FOREIGN PATENT DOCUMENTS

WO    WO 94/01272    *    1/1994

* cited by examiner

*Primary Examiner* — Amy Vanatta
(74) *Attorney, Agent, or Firm* — Alan Kamrath; Kamrath IP Lawfirm, P.A.

(57) ABSTRACT

A cloth assembly for making a protective pad for sports includes a plurality of supporting fibers extending between and supporting first and second knitted cloths, providing an elastic air-permeable cloth. A knitted cloth includes a first side having a plurality of loops and a second side bonded to an outer face of the first knitted cloth. A hook tape includes a plurality of hooks on a face thereof. The hook tape is fixed to the first side of the knitted cloth or an outer surface of the second knitted cloth according to the type of the protective pad to be made. When the hook tape is fixed to the knitted cloth, the face of the hook tape having the hooks faces the first side of the knitted cloth having loops. Only a portion of the hook tape overlaps and is fixed to an end of the knitted cloth.

2 Claims, 7 Drawing Sheets

CLOTH ASSEMBLY FOR MAKING A PROTECTIVE PAD FOR SPORTS

BACKGROUND OF THE INVENTION

The present invention relates to a cloth assembly for making a protective pad for sports and, more particularly, to a cloth assembly including an air-permeable cloth and a knitted cloth to provide an elastic, air-permeable, stretchable, and easy-to-use cloth.

Conventional protective pads for sports are generally made from a cloth assembly comprised of a substrate of neoprene or ethylene vinyl acetate (EVA) and a knitted cloth bonded to the substrate. Such a cloth assembly is stretchable and can be wrapped around a portion of a wearer such that the protective pad can deform responsive to movement of the portion of the wearer, reducing discomfort resulting from sports. However, the protective pad made of such a cloth assembly is not permeable to air.

A sandwiched type cloth assembly has been proposed to provide air permeability, softness, and stretchability. Specifically, the sandwiched type cloth assembly includes two parallel, spaced knitted cloths and a plurality of supporting fibers extending between the knitted cloths, with the supporting fibers providing elasticity. Although such a sandwiched type cloth assembly provides air permeability and softness and can be used to make protective pads for sports, the cloth assembly does not include a loop tape including loops that allow easy and releasably engagement with hooks of a hook tape. Namely, an additional loop tape is required. Furthermore, if it is intended to directly produce loops on a surface of the cloth assembly, the structure of the sandwiched type cloth assembly will be damaged. Thus, the sandwiched type cloth assembly is not suitable for direct manufacture of protective pads for sports.

In a solution to the above disadvantage, a loop tape is provided on the whole surface of the sandwiched type cloth assembly so that the sandwiched type cloth assembly can be used to make a protective pad for sports and can be wrapped around a portion of a wearer. A hook tape is provided to engage with the loops of the loop tape when the protective pad is wrapped around the user, providing desired positioning effect. However, the cloth assembly including the loop tape is not stretchable such that the cloth assembly can not be intimate contact with the portion of the wearer. Thus, the protective pad can not stretch responsive to movement of the portion of the wearer, causing discomfort to the user during sporting.

Thus, a need exists for a novel cloth assembly that can provide elasticity, air permeability, stretchability, and easy engagement.

BRIEF SUMMARY OF THE INVENTION

The present invention solves this need and other problems in the field of the material for making protective pads for sports by providing a cloth assembly including a first knitted cloth having an outer face and an inner face opposite to the outer face. A second knitted cloth includes an outer surface and an inner surface opposite to the outer surface. A plurality of supporting fibers extends between the inner face of the first knitted cloth and the inner surface of the second knitted cloth. Each of the plurality of supporting fibers includes a first end fixed to the inner face of the first knitted cloth and a second end fixed to the inner surface of the second knitted cloth. The plurality of supporting fibers supports the first and second knitted cloths. The first and second knitted cloths and the plurality of supporting fibers form an air-permeable cloth. A knitted cloth includes a first side and a second side opposite to the first side. The first side includes a plurality of loops formed by a plurality of fibers of the knitted cloth. The second side of the knitted cloth is bonded to the outer face of the first knitted cloth. A hook tape includes a first face and a second face opposite to the first face. The first face of the hook tape includes a plurality of hooks. The hook tape is fixed to the first side of the knitted cloth or the outer surface of the second knitted cloth.

When the hook tape is fixed to the first side of the knitted cloth, the first face of the hook tape faces the first side of the knitted cloth, a portion of the hook tape overlaps and is fixed to an end of the knitted cloth, and a remaining portion of the hook tape extends beyond the end of the knitted cloth.

On the other hand, when the hook tape is fixed to the outer surface of the second knitted face, the second face of the hook tape faces the outer surface of the second knitted face, the plurality of hooks of the hook tape is exposed and faces away from the outer surface of the second knitted cloth.

The air-permeable cloth and the knitted cloth fixed thereto are adapted to be wrapped around a portion of a wearer. When the air-permeable cloth and the knitted cloth are wrapped around the portion of the wearer, the plurality of hooks of the hook tape is releasably engaged with the loops of the knitted cloth.

In a form shown, the remaining portion of the hook tape has a length about ½ to ⅔ of an overall length of the hook tape.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "inner", "outer", "side", "end", "portion", "section", "length", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

A cloth assembly according to the present invention is shown in the drawings and generally designated 10. Cloth assembly 10 includes an air-permeable cloth 12. In the form shown, air-permeable cloth 12 includes a first knitted cloth 20 having an outer face 22 and an inner face 24 opposite to the outer face 22. Air-permeable cloth 12 further includes a second knitted cloth 30 having an outer surface 32 and an inner surface 34 opposite to outer surface 32. Air-permeable cloth 12 further includes a plurality of supporting fibers 40 extending between inner face 24 of first knitted cloth 20 and inner surface 34 of second knitted cloth 30. Each supporting fiber 40 includes a first end 42 fixed to inner face 24 and spaced from outer face 22 of first knitted cloth 20. Each supporting fiber 40 further includes a second end 44 fixed to inner surface 34 and spaced from outer surface 32 of second knitted cloth 30. Thus, a sandwich structure having three layers is provide, with supporting fibers 40 supporting first and second knitted cloths 20 and 30 to provide elasticity, and with gaps between supporting fibers 40 providing air-permeable effect.

Cloth assembly 10 further includes a knitted cloth 50 having a first side 52 and a second side 54 opposite to first side 52. First side 52 includes a plurality of loops 56 formed by a plurality of fibers of knitted cloth 50. Specifically, loops 56 can be formed by a napping procedure, such as by using a napping wheel of a napping machine, by using a nap-raising brush of a carder, by using a teasing needle, or by other knitting processing. Thus, loops 56 protrude out of first side 52 of knitted cloth 50 and serve as loops of a loop tape for releasable engagement with a hook tape. Second side 54 of knitted cloth 50 is fixed to the outer face 22 of first knitted cloth 20 by such as using glue 58. Thus, loops 56 are provided on an outer surface of air-permeable cloth 12 for releasable engagement with a hook tape.

Cloth assembly 10 further includes a hook tape 60 fixed to first side 52 of knitted cloth 50 or outer surface 32 of second knitted cloth 30 according to the type of the protective pads to be made. Hook tape 60 includes a first face 62 and a second face 64 opposite to first face 62. First face 62 of hook tape 60 includes a plurality of hooks 66.

Figure 1:
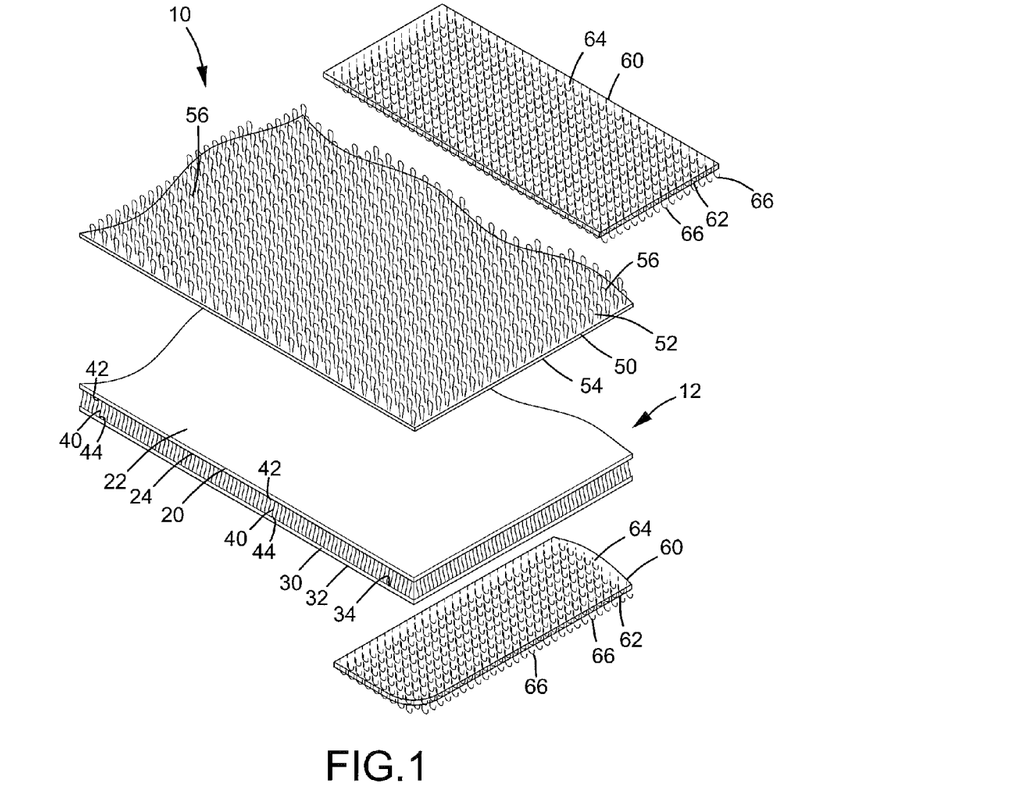
FIG. 1 shows an exploded, perspective view of a cloth assembly for making a protective pad for sports according to the present invention.
Figure 2:
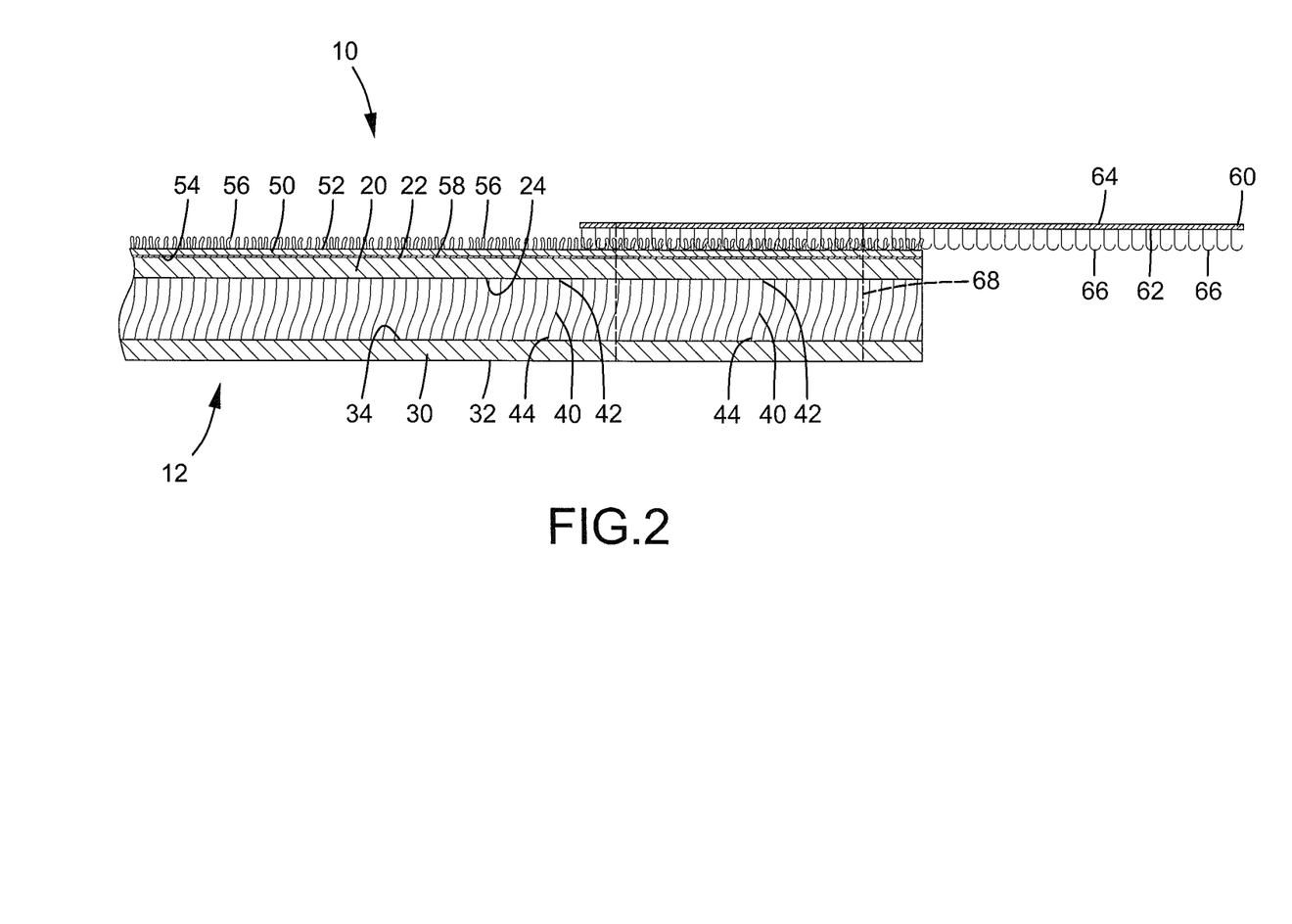
FIG. 2 shows a cross sectional view of an example of the cloth assembly of FIG. 1 after assemblage.

In an example (see FIGS. 2, 4, and 5), hook tape 60 is fixed to first side 52 of the knitted cloth 50, with first face 62 of hook tape 60 facing first side 52 of knitted cloth 50. A portion of hook tape 60 overlaps and is fixed to an end of knitted cloth 50 by such as a seam 68, with a remaining portion of hook tape 60 forming a free section extending beyond the end of knitted cloth 50. The remaining portion of hook tape 60 has a length about ½ to ⅔ of an overall length of hook tape 60. By such an arrangement, when hooks 66 of hook tape 60 engage with loops 56 of knitted cloth 50, a reliable engagement effect is provided while allowing easy detachment of hooks 66 from loops 56.

Figure 3:
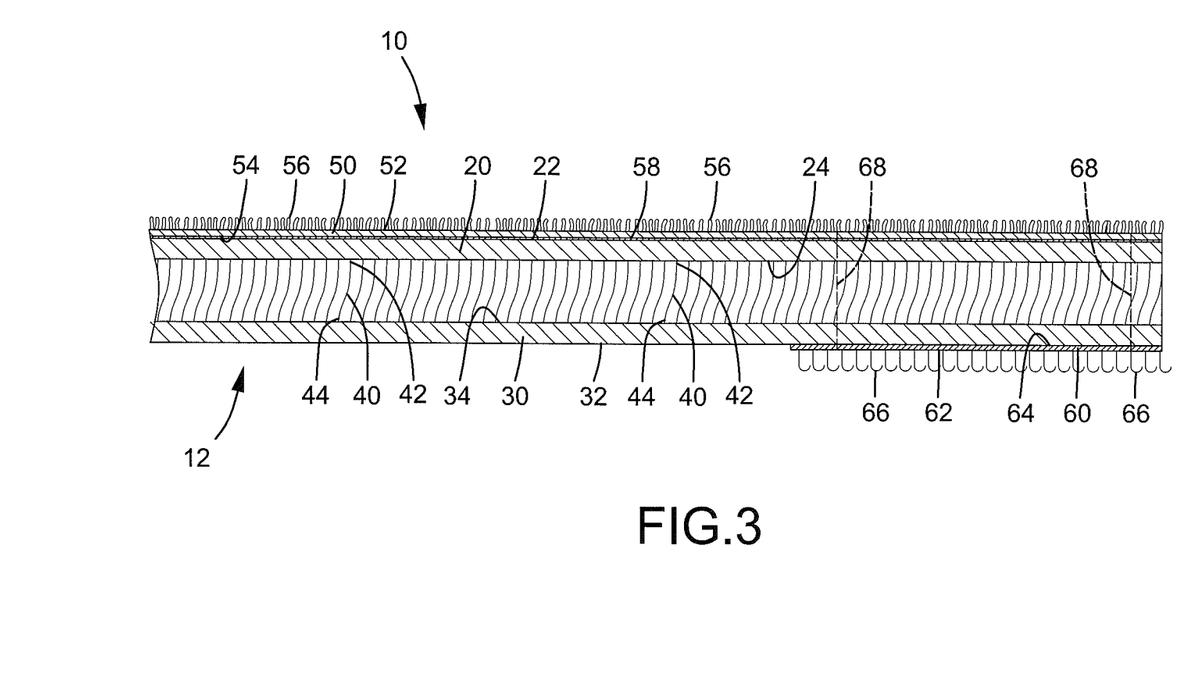
FIG. 3 shows a cross sectional view of another example of the cloth assembly of FIG. 1 after assemblage.

In another example (see FIGS. 3, 6, and 7), hook tape 60 is fixed to outer surface 32 of second knitted face 30 by such as a seam 68, with second face 64 of hook tape 60 facing outer surface 32 of second knitted face 30. Hooks 66 of hook tape 60 are exposed and face away from outer surface 32 of second knitted cloth 30.

Figure 4:
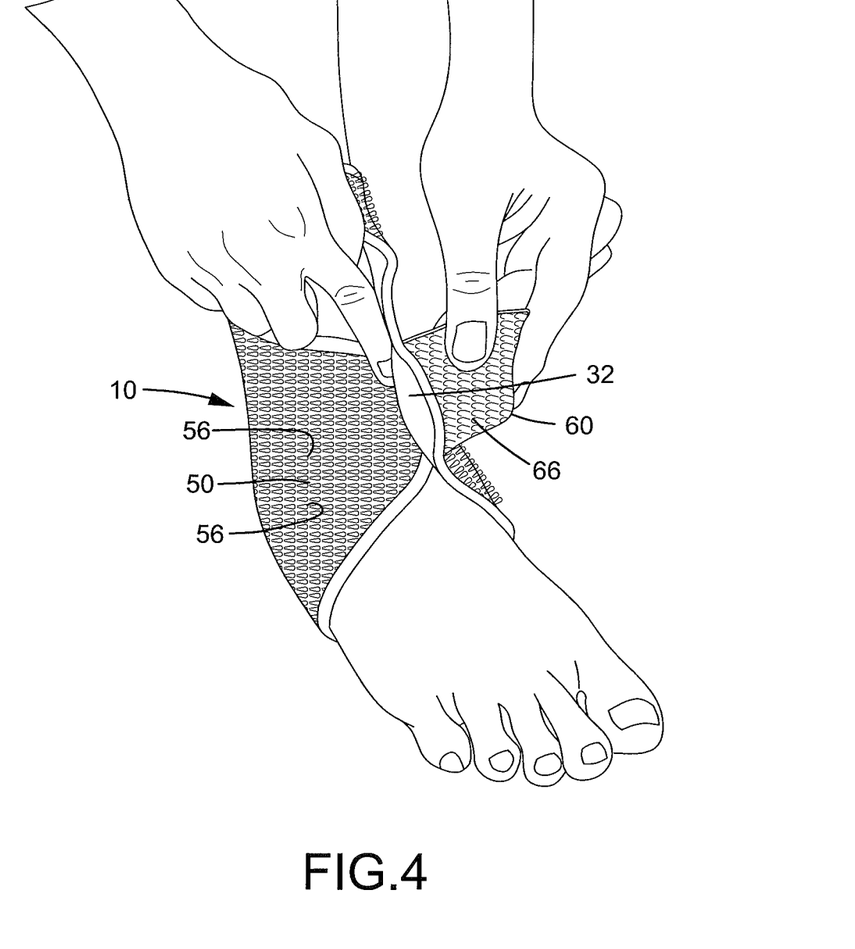
FIG. 4 shows a perspective view illustrating use of the cloth assembly of FIG. 2 on a heel of a wearer.

In use of the example shown in FIG. 4, cloth assembly 10 is used to make a protective pad for protecting a heel of a wearer. Specifically, cloth assembly 10 is wrapped around the heel of the wearer, and hooks 66 on the free section of hook tape 60 are engaged with loops 56 of knitted cloth 50. Due to air permeability and stretchability provided by air-permeable cloth 12 and knitted cloth 50, cloth assembly 10 can be in intimate contact with the heel and can deform responsive to movement of the heel, providing use comfort.

Figure 5:
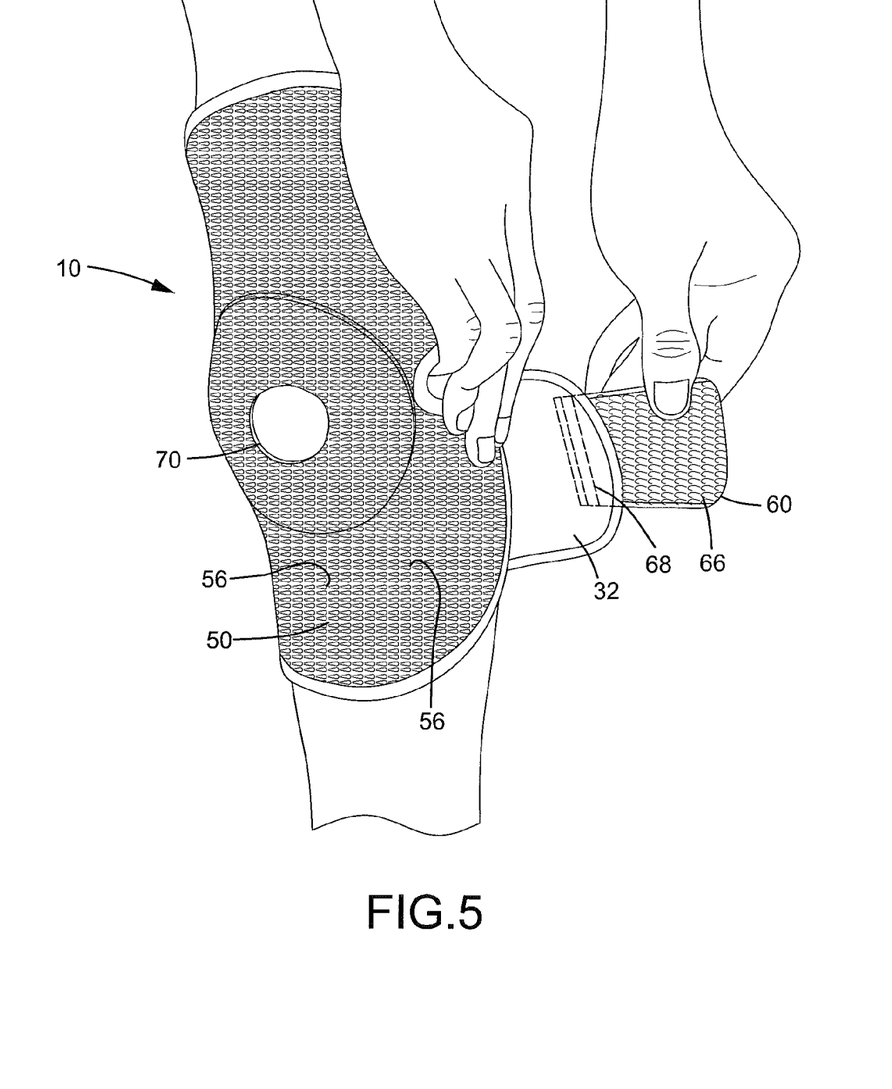
FIG. 5 shows a perspective view illustrating use of the cloth assembly of FIG. 2 on a knee of a wearer.

In use of the example shown in FIG. 5, cloth assembly 10 is used to make a protective pad for protecting a knee of a wearer. Specifically, cloth assembly 10 includes an opening 70. Cloth assembly 10 is wrapped around the knee of the wearer, with opening 70 aligned with the knee. Hooks 66 on the free section of hook tape 60 are engaged with loops 56 of knitted cloth 50. Due to air permeability and stretchability provided by air-permeable cloth 12 and knitted cloth 50, cloth assembly 10 can be in intimate contact with the knee and can deform responsive to movement of the knee, providing use comfort.

Figure 6:
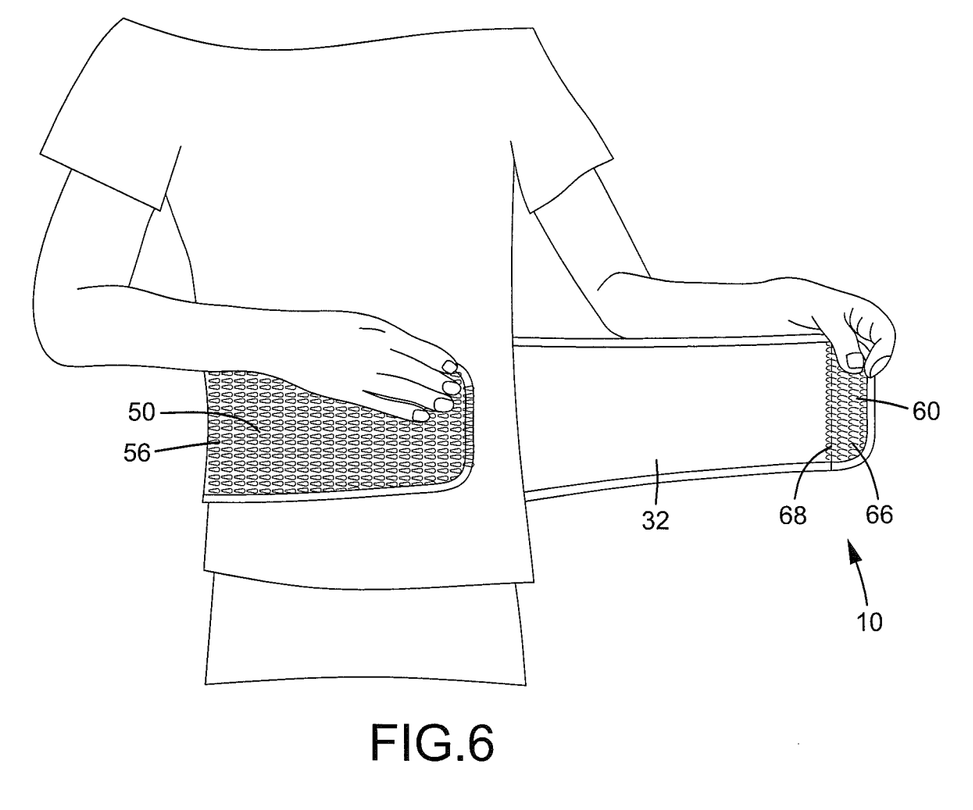
FIG. 6 shows a perspective view illustrating use of the cloth assembly of FIG. 3 on a waist of a wearer.
Figure 7:
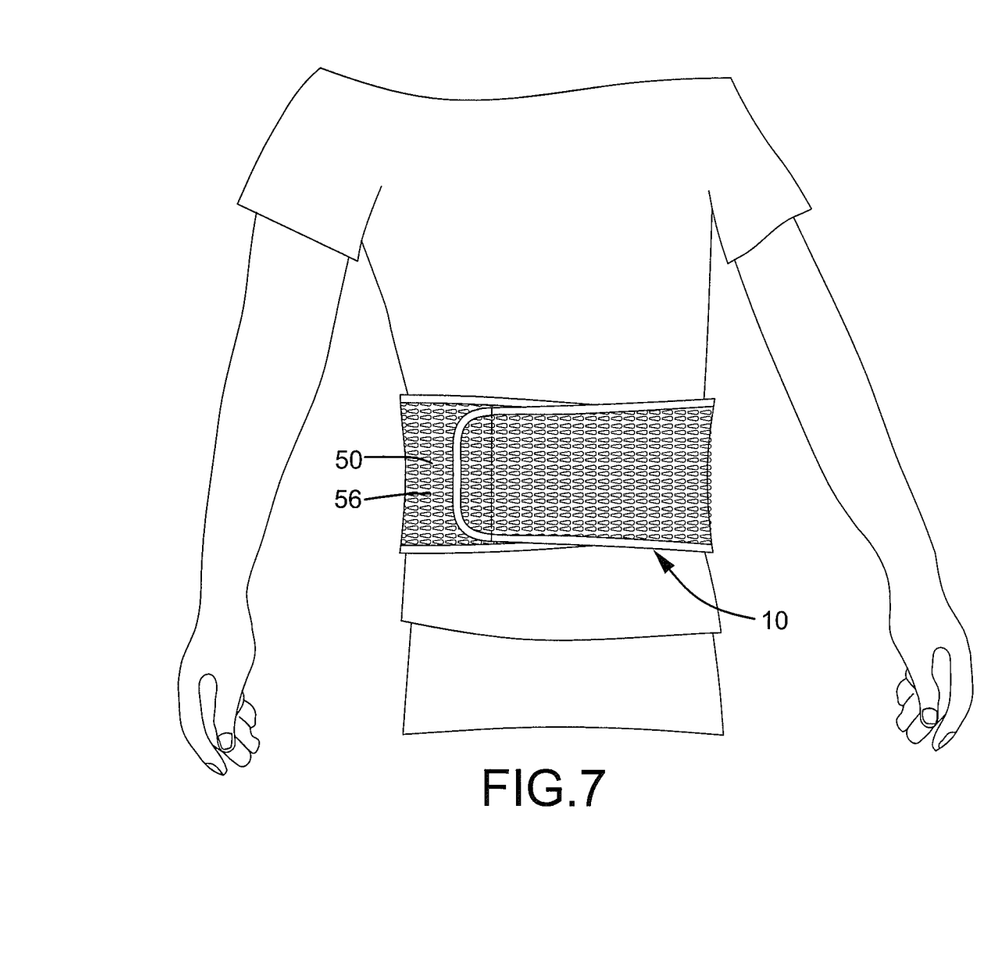
FIG. 7 is a view similar to FIG. 6, with the cloth assembly wrapped around and positioned on the waist of the wearer.

In a further example shown in FIGS. 6 and 7, cloth assembly 10 is wrapped around a waist of a wearer and serves as a waist protector. Hooks 66 on first face 62 of the hook tape 60 are engaged with loops 56 of knitted cloth 50. Due to air permeability and stretchability provided by air-permeable cloth 12 and knitted cloth 50, cloth assembly 10 can be in intimate contact with the waist and can deform responsive to movement of the waist, providing use comfort.

Thus, by providing knitted cloth 50 fixed to air-permeable cloth 12 and by providing hook tape 60 fixed to first side 52 of knitted cloth 50 or outer surface 32 of second knitted cloth 30, cloth assembly 10 can be used to make a protective pad for sports. Since loops 56 are provided on first side 52 of knitted cloth 50, a surface of cloth assembly 10 thus formed can serve as a loop tape having loops. The protective pad made of cloth assembly 10 can be wrapped around a portion of a wearer to be protected, with hooks 66 of hook tape 60 engaged with loops 56 of knitted cloth 50. Thus, the protective pad can be in intimate contact with the skin of the portion of the wearer and can deform responsive to movement of the portion of the wearer, providing use comfort.

Now that the basic teachings of the present invention have been explained, many extensions and variations will be obvious to one having ordinary skill in the art. For example, second side 54 of knitted cloth 50 can be bonded to outer surface 32 of second knitted cloth 30 of air-permeable cloth 12, and hook tape 60 can be fixed to outer face 22 of first knitted cloth 20. Furthermore, cloth assembly 10 can be used to make a wrist protector for protecting a wrist of a wearer. The wrist protector can include an opening similar to opening 70 of the example shown in FIG. 5.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A cloth assembly for making a protective pad for sports comprising:
    a first knitted cloth including an outer face and an inner face opposite to the outer face;
    a second knitted cloth including an outer surface and an inner surface opposite to the outer surface;
    a plurality of supporting fibers extending between the inner face of the first knitted cloth and the inner surface of the second knitted cloth, with each of the plurality of supporting fibers including a first end fixed to the inner face of the first knitted cloth and a second end fixed to the inner surface of the second knitted cloth, with the plurality of supporting fibers supporting the first and second knitted cloths, with the first and second knitted cloths and the plurality of supporting fibers forming an air-permeable cloth;

a knitted cloth including a first side and a second side opposite to the first side, with the first side including a plurality of loops, with the plurality of loops formed by a plurality of fibers of the knitted cloth, with the second side of the knitted cloth bonded to the outer face of the first knitted cloth; and a hook tape including a first face and a second face opposite to the first face, with the first face of the hook tape including a plurality of hooks, with the hook tape fixed to the first side of the knitted cloth or the outer surface of the second knitted cloth, wherein with the hook tape fixed to the first side of the knitted cloth, the first face of the hook tape faces the first side of the knitted cloth, a portion of the hook tape overlaps and is fixed to an end of the knitted cloth, and a remaining portion of the hook tape extends beyond the end of the knitted cloth, wherein with the hook tape fixed to the outer surface of the second knitted face, the second face of the hook tape faces the outer surface of the second knitted face, the plurality of hooks of the hook tape is exposed and faces away from the outer surface of the second knitted cloth, wherein the air-permeable cloth and the knitted cloth fixed thereto are adapted to be wrapped around a portion of a wearer, wherein with the air-permeable cloth and the knitted cloth wrapped around the portion of the wearer, the plurality of hooks of the hook tape is releasably engaged with the loops of the knitted cloth.

2. The cloth assembly as claimed in claim 1, with the remaining portion of the hook tape having a length about ½ to ⅔ of an overall length of the hook tape.

* * * * *